INVENTORS.
OLE MARCUS
CHARLES B. KURZ

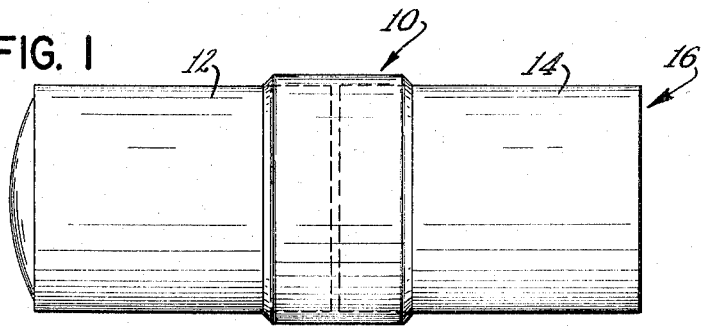
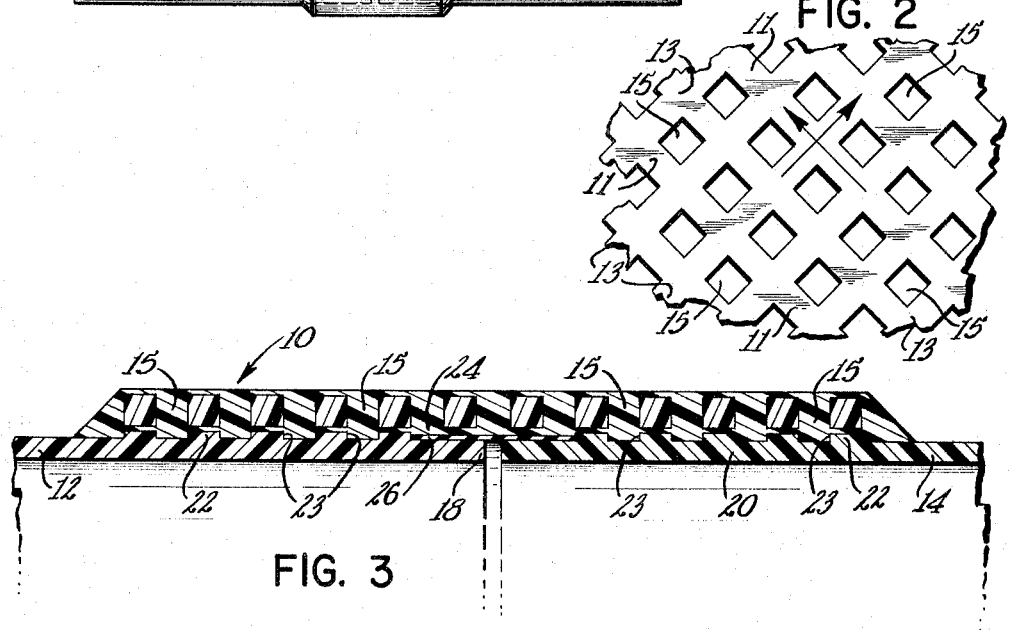
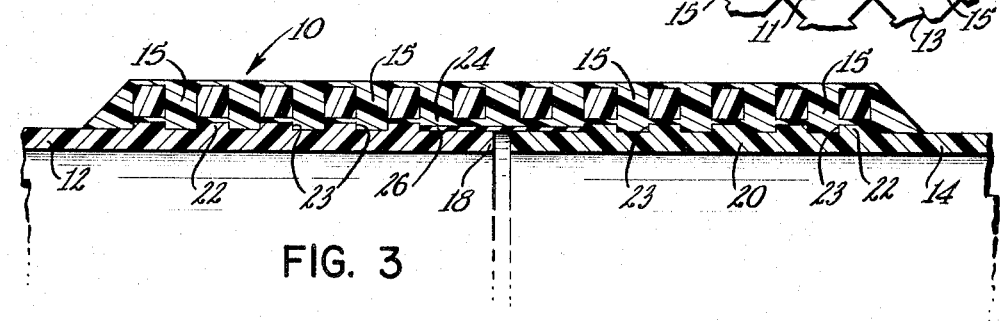
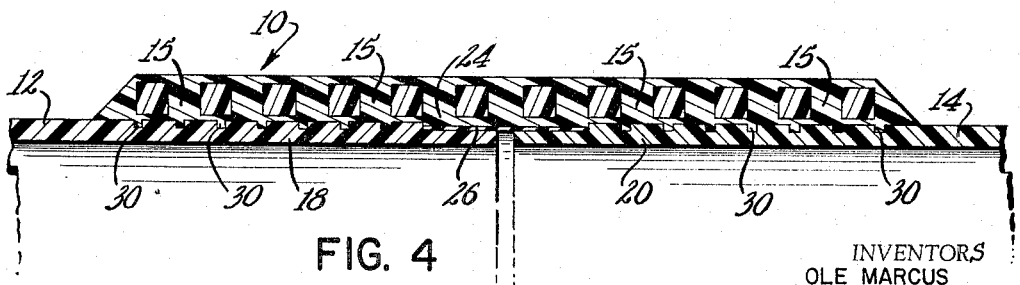

BY Leonard H. King
ATTORNEY

United States Patent Office 3,284,110
Patented Nov. 8, 1966

3,284,110
COUPLING MEANS FOR TUBULAR MEMBERS
Ole Marcus, Wantagh, and Charles B. Kurz, West Islip, N.Y., assignors to Koppers Company, Inc., a corporation of Delaware
Filed Oct. 17, 1963, Ser. No. 316,880
5 Claims. (Cl. 285—235)

This invention relates to means for coupling coaxial, resin bonded, filament wound tubular members and more particularly to coupling means therefor formed of resin bonded, filament wound structures.

A typical application for resin bonded, filament wound cylinders is in pipe lines. It is not uncommon for these lines to be as much as 30 inches in diameter and to extend for many miles cross country. Consequently, it is highly desirable to provide individual lengths of pipe that may be readily transported to the needed location and then joined in the field. The present invention makes such an operation practical. The cast joint between two adjacent, coaxial pipes may be cured at low temperature with inexpensive and mobile equipment thus assuring a trouble free pipeline requiring a minimum of maintenance.

Still another application for the present invention is in solid propellant rocket engine cases. Such cylinders have been wound up to diameters of 7 feet and in lengths up to 30 feet, and are suitable for even larger structures. Casings fabricated from resin bonded, filament wound glass fibers exhibit strength-to-weight ratios up to 270% higher than steel. Some additional advantages of such structures include superior thermal and electrical insulation, greater resistance to erosion, impact and shattering as well as wider versatility in choice of cylinder size and shape.

Prior art couplings included, among other devices, threaded clamp members. In some instances, flanges were provided on the confronting ends of the pipe sections to be coupled so that the individual members could be bolted together. This approach introduces special sealant problems. The special, machined fittings used in the prior art are, in addition, very expensive particularly in the larger sizes. The quantities of fittings used in a typical cross country pipe line, makes their cost a budget item of considerable importance and one that cannot be ignored.

The present invention is directed towards providing a low cost coupling of resin bonded, filament wound fibre glass that may be applied by the same techniques used in fabricating the individual filament wound sections. Therefore, the desirable characteristics of filament wound cylinders will also be present in an integral coupling member. In one embodiment of the invention, a basket type weave is formed on the adjacent ends of the pair of tubular members to be coupled and a coupling sleeve, formed with an apertured or porous basket type weave is resin bonded thereto. In this embodiment the O.D. of the end portions of the tubular members to be coupled are also provided with the open, basket type weave during the winding process of the member.

Another embodiment of the present invention contemplates scoring or otherwise roughing up the adjacent, opposed end portions of the pair of tubular members to be coupled. Once again, a coupling sleeve formed with an apertured or porous basket-type weave is resin bonded thereto. The scoring of the tubular member end portions may be done on a lathe after completion of the winding and curing of the tubular member.

In either embodiment, the sleeve or coupling member is fabricated by winding resin bonded filaments in an open or basket type weave. The wall of the sleeve is relatively thin, typical dimensions of which will be brought out more fully hereinafter. Because of the open, basket type formation of the sleeve, axial loads on the coupled sections will result in a scissor type action of the filament bundles. This tends to produce a slight radial or compressive force by the sleeve and consequently on the adjacent end portions of the coupled cylindrical members.

An additional advantage inherent in the basket type weave of the coupling member of the present invention is that slight variations in the diameter and roundness of the cylindrical members may be accommodated. Whereas, the rigidity of prior art coupling means presented limitations, the present invention, by way of contrast, can overcome slight tolerance variations and even, in some less critical applications, lack of concentricity or misalignment between the two tubular members to be coupled. In the instance where concentricity between adjacent parts is not a critical factor, such as in pipelines for the transport of a liquid, the initial flexibility or self-aligning characteristic of the sleeve permits coupling of members which are slightly skewed. Subsequent resin bonding and curing in the field at normal atmospheric temperatures provides structural rigidity.

Accordingly, it is an object of the present invention to provide a low cost, light weight coupling member for filament wound, resin bonded tubular members.

Another object is to provide a filament wound resin bonded coupling member.

Still another object is to provide a filament wound coupling member that may be resin bonded to the adjacent ends of two tubular members.

An additional object is to provide a hollow coupling member having a porous, basket type weave wall adapted to be resin bonded to a pair of adjacent tubular members that are substantially coaxial.

A further object is to provide a pipe line comprised of lengths of tubing and unthreaded coupling sleeves for joining said elements in the field as needed by means of in situ formed resin keys.

A still further object is to provide improved pipe line coupling elements.

These and other features, objects and advantages of the invention will, in part, be pointed out with particularity and will, in part, become obvious from the following more detailed description of the invention, taken in conjunction with the accompanying drawings, which form an integral part thereof.

In the various figures of the drawing like reference characters designate like parts.

In the drawings:

FIG. 1 is a longitudinal side elevational view of the present invention as embodied typically in a rocket engine casing;

FIG. 2 is an enlarged, fragmentary plan view of the basket weave coupling of the present invention;

FIG. 3 is an enlarged, fragmentary, longitudinal section illustrating the coupling member of the present invention bonded to two adjacent cylindrical members;

FIG. 4 is a view similar to FIG. 3 illustrating an alternative embodiment of the present invention;

Figure 5:
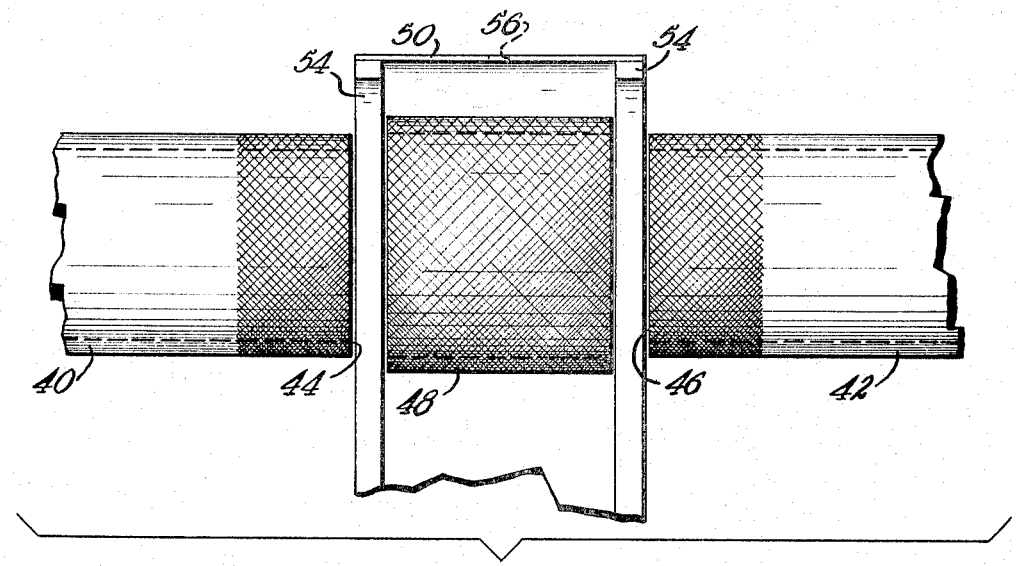
FIG. 5 is an exploded side elevation view, partly in section, illustrating the components of the present invention as applied to a pipe line prior to assembly.

Referring now to FIG. 1 of the drawings coupling member 10 joins sections 12 and 14 of a cylindrical filament wound casing 16. The coupling is formed by winding continuous, resin bonded filaments in such a manner as to produce the basket weave effect illustrated in FIG. 2. Coupling member 10 is comprised of successive layers having a plurality of bands 11 helically wound in one longitudinal direction and a plurality of bands 13 wound in the opposite longitudinal direction at an equal but opposite helical angle. Bands 11 and 13 define spaces 15 therebetween.

Since the coupling member is in the order of ½ inch thick it will be seen that any axial forces encountered by the finished product will result in slight radial or compressive forces in the coupling member. This is due to the scissor type action of the cross strands as seen in FIG. 2 and will be maintained even after bonding and curing. The compressive, or inwardly radial force tends to further clamp the two adjacent ends of cylindrical sections 12 and 14.

The enlarged view of FIG. 3 illustrates the manner of bonding the coupling to the cylindrical members. In the embodiment illustrated, members 12 and 14 each have inside diameters in the order of 30 inches and each has a wall thickness of approximately 0.300 inch over substantially their entire lengths. However, adjacent ends 18 and 20, respectively, are provided with an integrally wound basket type weave 22, approximately ⅛ inch thick and extending back from the ends for approximately 6 inches. Spaces 23, between adjacent, crossed strands of the basket weave, serve as reservoirs for the subsequently applied epoxy or other suitable resin bonding material 24.

The opposed, adjacent ends of the cylindrical members are provided with a circumferential band 26 of 1/32 inch thick gum rubber. Band 26 overlaps the ends of both cylindrical members and serves as a seal to prevent the flow of bonding resin to the interior of the coupled cylindrical members.

In the embodiment illustrated, the cylindrical members, as well as the coupling members, are formed of fibreglass. An epoxy resin such as bisphenol-epichlorhydrin, an alkyde resin or an acrylic resin may be used as the bonding agent. These particular materials are specified by way of illustration and are not intended to be limiting.

The embodiment illustrated by FIG. 4 teaches another method for forming a coupling between a pair of coaxially disposed cylindrical members. Score marks 30, which may be a continuous helical cut formed on a lathe, are made in the adjacent ends of the cylindrical members. The circumferential sealing band and the coupling sleeve having a basket type weave are properly positioned and secured by means of an epoxy resin as described hereinabove.

Figure 6:
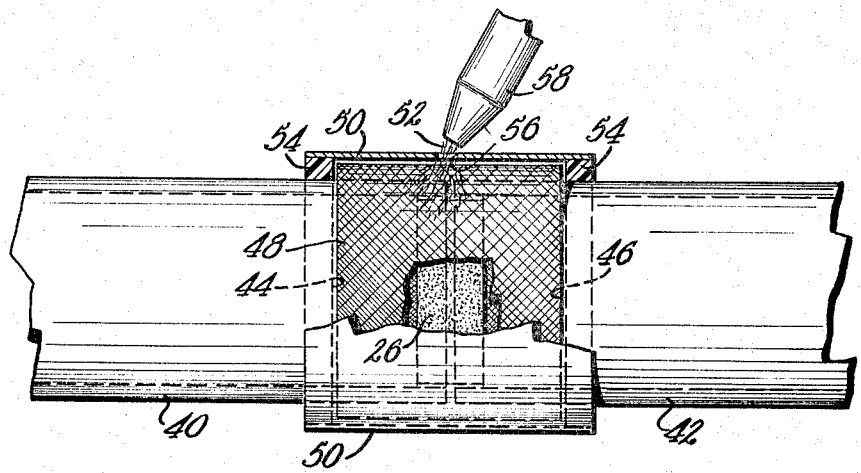
FIG. 6 is a view similar to FIG. 5 illustrating the same components in assembled condition.

The application of the present invention to long length, large diameter pipe lines is illustrated in FIG. 5 and FIG. 6. There is shown, for example, the confronting ends of two lengths of coaxial pipe 40 and 42. The end portions thereof, 44 and 46 respectively, are provided with an irregular surface as disclosed hereinbefore with regard to FIGS. 3 and 4. Coupling member 48 is provided with wall structure as shown in FIG. 2.

After the pipe lengths are brought into abutting relationship with the coupling member in place, a suitable shroud or sleeve 50 is placed about the joint. The shroud may be any one of a number of suitable materials such as a sheet of aluminum, paper, fabric etc. The shroud, which may also be a preformed cylinder, fits tightly against the pipe to retain the resin. For assembly in the field the shroud may be cut to the proper length from a supply roll. Gaskets 54, which may be advantageously formed of foam polyurethane, would then be adhered to either the marginal edges on the inside of the shroud or to the outside surface of the pipes. In either case a resin retaining pocket is defined in the area of coupling member 48. Resin 52 is poured through an opening 56 in the shroud from a supply source 58 so that the openings in the coupling member are filled. Upon curing, the resin filled spaces effectively act as keying members between the coupling sleeve and the lengths of pipe. As in the embodiments shown in FIG. 3 and FIG. 4, an internal, circumferential band 26 may be provided to retain the fluid resin at the junction of the two pipe sections.

It is obvious then, that by the proper selection of a resin that cures at a low temperature, the present apparatus is admirably suited to assembly of pipes in the field. Moreover, since the formation of seals is no longer a problem, more convenient lengths of pipe may be utilized with the full assurance that the joints formed thereon will be liquid tight.

Both embodiments illustrate simple, inexpensive, yet effective, means for coupling a pair of adjacent, coaxially disposed cylindrical members. In either embodiment the structural integrity of the members to be coupled is preserved. Moreover, the coupling member itself exhibits structural properties comparable to the adjacent members so that the resulting product is truly uniform. This permits an almost indefinite length of cylindrical member to be formed merely by successively coupling many individual lengths.

There has been disclosed heretofore the best embodiments of the invention presently contemplated and it is to be understood that various changes and modifications may be made by those skilled in the art without departing from the spirit of the invention.

What is claimed is:

1. An assembly comprised of a pair of coaxially aligned tubular members having a basket-type weave formed on the outside surface of the confronting end portions thereof, said basket-type weave having spaces between adjacent strands, a yieldable hollow apertured sleeve provided with a basket-type weave having spaces between adjacent strands, said sleeve in the assembled condition encasing the confronting end portions of said tubular members and a continuous synthetic resin mass bonded to and substantially filling the spaces in the outer surface of said end portions and said sleeve.

2. The apparatus of claim 1 wherein said end portions of said tubular members are provided with grooves and said sleeve is provided with a basket type weave having spaces between adjacent strands whereby said resin substantially fills the spaces in said grooves and said sleeve.

3. The apparatus of claim 1 wherein said end portions of said tubular members have a basket type weave integrally formed only on the outer surface thereof.

4. The apparatus of claim 1 wherein said grooves are formed only on the outer surface of said tubular members' end portions, said grooves being axially spaced from one another.

5. The apparatus of claim 2 wherein said grooves are continuous, said grooves being formed in a helical configuration.

References Cited by the Examiner

UNITED STATES PATENTS

| | | | |
|---|---|---|---|
| 339,036 | 3/1886 | Wilbur | 285—294 |
| 615,149 | 11/1898 | Farley | 285—294 |
| 950,264 | 2/1910 | Hugo | 285—294 X |
| 1,577,090 | 3/1926 | Zander | 285—292 |
| 2,156,604 | 5/1939 | Payne et al. | 285—294 X |
| 2,189,987 | 2/1940 | Kellems | 285—305 X |
| 2,759,254 | 8/1956 | Soehnlen et al. | 285—294 X |
| 2,794,483 | 6/1957 | Hopkins et al. | 285—294 X |
| 2,986,411 | 5/1961 | Anderson | 285—423 X |
| 3,106,940 | 10/1963 | Young. | |

FOREIGN PATENTS

| | | |
|---|---|---|
| 1,133,731 | 11/1956 | France. |
| 859,954 | 1/1961 | Great Britain. |

CARL W. TOMLIN, *Primary Examiner.*

D. W. AROLA, *Assistant Examiner.*